(12) United States Patent
Kelly (10) Patent No.: US 9,827,998 B1
(45) Date of Patent: Nov. 28, 2017

(54) SYSTEM AND METHOD FOR TESTING CRASH AVOIDANCE TECHNOLOGIES

(71) Applicant: Dynamic Research, Inc., Torrance, CA (US)

(72) Inventor: Joseph Kelly, Lakewood, CA (US)

(73) Assignee: Dynamic Research, Inc., Torrance, CA (US)

(*) Notice: Subject to any disclaimer, the term of this patent is extended or adjusted under 35 U.S.C. 154(b) by 0 days.

(21) Appl. No.: 15/408,759

(22) Filed: Jan. 18, 2017

Related U.S. Application Data (60) Provisional application No. 62/429,785, filed on Dec. 3, 2016.

(51) Int. Cl.

| | |
|---|---|
| *G06F 17/10* | (2006.01) |
| *G06G 7/78* | (2006.01) |
| *G08G 1/16* | (2006.01) |
| *B60W 50/04* | (2006.01) |
| *G05D 1/00* | (2006.01) |
| *G05D 1/02* | (2006.01) |
| *B60W 30/18* | (2012.01) |
| *B60W 10/08* | (2006.01) |
| *B60W 10/18* | (2012.01) |
| *G01M 17/06* | (2006.01) |
| *G09B 23/30* | (2006.01) |
| *A63H 11/18* | (2006.01) |

(52) U.S. Cl.
CPC .......... *B60W 50/045* (2013.01); *B60W 10/08* (2013.01); *B60W 10/18* (2013.01); *B60W 30/18181* (2013.01); *G01M 17/06* (2013.01); *G05D 1/0011* (2013.01); *G05D 1/0278* (2013.01); *G09B 23/30* (2013.01); *A63H 11/18* (2013.01); *B60W 2050/046* (2013.01)

(58) Field of Classification Search
CPC ...... A63H 11/18; G05D 1/0011; G01M 17/00
USPC .......................... 701/301, 302; 40/411, 420
See application file for complete search history.

(56) References Cited

U.S. PATENT DOCUMENTS

| | | | | |
|---|---|---|---|---|
| 5,443,188 | A * | 8/1995 | Kotlarsky | A63H 11/18 223/66 |
| 2012/0047781 | A1 * | 3/2012 | Wondra | G09F 19/08 40/411 |
| 2016/0042667 | A1 * | 2/2016 | Kusafuka | A63H 3/06 434/365 |

* cited by examiner

*Primary Examiner* — Isaac Smith
(74) *Attorney, Agent, or Firm* — Manuel de la Cerra (57) ABSTRACT

A Dynamic Motion Element (DME) is disclosed that includes a platform, and a pair of foot movement mechanisms. The foot movement mechanisms each include a drive pulley connected to at least one wheel of the DME, a second pulley and a foot drive belt that has a foot connection structure constructed to detachably connect to the foot of the mannequin. The foot connection structure is constructed to move about each pulley. The first and second foot movement mechanisms are constructed such that when the DME moves in a longitudinal direction relative to the ground, the foot connection structure of the first foot movement mechanism remains in substantially the same longitudinal position relative to the ground while the foot connection structure of the second foot movement mechanism moves in the same longitudinal direction as the DME. When a mannequin is connected to the foot connection structures, the DME produces a more natural looking gait.

24 Claims, 10 Drawing Sheets

Example GST System Architecture
FIG.10

SYSTEM AND METHOD FOR TESTING CRASH AVOIDANCE TECHNOLOGIES

1.0 RELATED APPLICATIONS

The present invention claims priority as the non-provisional of U.S. Provisional Patent Application No. 62/429,785 entitled "Striding Motion for Pedestrian Dummy on a Moving Platform", filed Dec. 3, 2016; which is hereby incorporated in its entirety including all tables, figures and claims.

The present invention is related to U.S. Provisional Patent Application No. 62/359,929, filed Jul. 8, 2016; U.S. patent application Ser. No. 14/207,892, filed Mar. 13, 2014; U.S. patent application Ser. No. 14/062,287, filed Oct. 24, 2013; U.S. Provisional Application No. 61/874,274, filed Sep. 5, 2013; U.S. Provisional Application No. 61/874,267, filed Sep. 5, 2013; United States Provisional Application No. 61/874,264, filed Sep. 5, 2013; U.S. patent application Ser. No. 13/532,417, filed Jun. 25, 2012; U.S. patent application Ser. No. 13/532,430, filed Jun. 25, 2012; U.S. Provisional Application No. 61/507,539, filed Jul. 13, 2011; U.S. Provisional Application No. 61/578,452, filed Dec. 21, 2011; U.S. patent application Ser. No. 13/357,526, filed Jan. 24, 2012; U.S. Provisional Application No. 61/621,597, filed Apr. 9, 2012; U.S. Provisional Application No. 61/639,745, filed Apr. 27, 2012; U.S. patent application Ser. No. 14/050,039, filed Oct. 9, 2013; and U.S. patent application Ser. No. 14/050,048, filed Oct. 9, 2013, all of which are hereby incorporated in their entirety including all tables, figures and claims.

2.0 TECHNICAL FIELD

The present invention relates to devices, systems, and methods for testing crash avoidance technologies.

3.0 BACKGROUND

The system disclosed herein can be used with, but is not limited to, vehicles employed in crash avoidance technologies disclosed in the following patent applications developed by the same inventors and assigned to the same assignee: U.S. patent application Ser. No. 14/050,039 entitled "System and Method for testing Crash Avoidance Technologies" filed on Oct. 9, 2013 by Joseph Kelly et al; U.S. patent application Ser. No. 14/050,048 entitled "System and Method for testing Crash Avoidance Technologies" filed on Oct. 9, 2013 by Joseph Kelly et al; U.S. Patent Application No. 61/874,274 entitled "Master-Slave Automated Coordinated Vehicle Control" filed Sep. 5, 2013 by Joseph Kelly et al; U.S. Patent Application No. 61/874,267 entitled "Rigid Belt Drive Tensioner" filed Sep. 5, 2013 by Joseph Kelly et al; U.S. Patent Application No. 61/874,264 entitled "Robotic Hydraulic Brake Master Cylinder" filed Sep. 5, 2013 by Joseph Kelly et al; U.S. patent application Ser. No. 13/357,526 entitled "System and Method for Testing Crash Avoidance Technologies" filed Jan. 24, 2012 by Joseph Kelly et al (issued as U.S. Pat. No. 8,447,509); U.S. Patent Application No. 61/507,539 entitled "Guided Soft Target For Full Scale Advanced Crash Avoidance Technology Testing" filed on Jul. 13, 2011 by Joseph Kelly et al; U.S. Patent Application No. 61/578,452 entitled "Guided Soft Target For Full Scale Advanced Crash Avoidance Technology Testing" filed on Dec. 21, 2011 filed by Joseph Kelly et al; U.S. Patent Application No. 61/621,597 entitled "Collision Partner, System and Method" filed on Apr. 9, 2012 by Joseph Kelly et al; U.S. Patent Application No. 61/639,745 entitled "Devices, Systems, And Methods For Testing Crash Avoidance Technologies" filed on Apr. 27, 2012 by Joseph Kelly et al; U.S. patent application Ser. No. 13/532,366 entitled "Devices, Systems, And Methods For Testing Crash Avoidance Technologies" filed on Jun. 25, 2012 by Joseph Kelly et al (issued as U.S. Pat. No. 8,428,863); U.S. patent application Ser. No. 13/532,383 entitled "Devices, Systems, And Methods For Testing Crash Avoidance Technologies" filed on Jun. 25, 2012 by Joseph Kelly et al (issued as U.S. Pat. No. 8,428,864); U.S. patent application Ser. No. 13/532,396 entitled "Devices, Systems, And Methods For Testing Crash Avoidance Technologies" filed on Jun. 25, 2012 by Joseph Kelly et al (issued as U.S. Pat. No. 8,457,877); U.S. patent application Ser. No. 13/532,417 entitled "Devices, Systems, And Methods For Testing Crash Avoidance Technologies" filed on Jun. 25, 2012 by Joseph Kelly et al; and U.S. patent application Ser. No. 13/532,430 entitled "Devices, Systems, And Methods For Testing Crash Avoidance Technologies" filed on Jun. 25, 2012 by Joseph Kelly et al. Each of these patent applications is incorporated herein in their entirety including all tables, figures, and claims.

As Advanced Crash Avoidance Technologies (ACATs) such as Forward Collision Warning (FCW), Crash Imminent Braking Systems and other advanced technologies continue to be developed, the need for full-scale test methodologies that can minimize hazards to test personnel and damage to equipment has rapidly increased. Evaluating such ACAT systems presents many challenges. For example, the evaluation system should be able to deliver a potential Soft Collision Partner (Soft CP) reliably and precisely along a trajectory that would ultimately result in a crash in a variety of configurations, such as rear-ends, head-ons, crossing paths, and sideswipes. Additionally, the Soft Collision Partner should not pose a substantial physical risk to the test driver, other test personnel, equipment, or to subject vehicles in the event that the collision is not avoided. This challenge has been difficult to address. Third, the Soft CP should appear to the subject vehicle as the actual item being simulated, such as a motor vehicle, a pedestrian, or other object. For example, the Soft CP should provide a consistent signature for radar and other sensors to the various subject vehicles, substantially identical to that of the item being simulated. It would be also advantageous for the Soft CP to be inexpensive and repeatably reusable with a minimum of time and effort.

As disclosed in the inventors' previous patent applications, fully incorporated herein by reference, the Guided Soft Target (GST) system includes a dynamic motion element (DME) as a mobile and controllable platform that carries the Soft CP. The DME is of such shape and dimension that it can be run over by the vehicle under test (aka the subject vehicle), with little to no damage to either the DME or the subject vehicle. When a collision occurs with the GST system, the subject vehicle impacts the Soft CP, which then absorbs the collision and may collapse and/or separate from the DME. Such a Soft CP is disclosed in U.S. patent application Ser. No. 13/532,366 (issued as U.S. Pat. No. 8,428,863), incorporated by reference. This is disclosed fully in the previous patent applications listed above and incorporated by reference.

The innovations disclosed in this application implement a modified DME to allow for testing of pedestrian crash avoidance. During the development and evaluation phases of Pedestrian Automatic Emergency Braking (PAEB) systems, pedestrian dummies are often used as surrogates for actual pedestrians, in order to reduce the risk of physical harm to the pedestrians themselves, and to the operator of the vehicle under test. Some pedestrian dummies are used in fixed postures, and are used either in stationary positions, or while mounted on moving platforms. These dummies, when used on moving platforms, often resemble a skateboard rider, since no leg motion can be observed to correspond with the overall motion of the pedestrian dummy.

Many current PAEB systems rely on the observation of striding motion of the legs in order to categorize a moving object as a pedestrian. Proper categorization also often depends on the observation that the foot is in contact with (and, consequently, stationary relative to) the ground during the "stance" phase of the gait.

Prior art systems include self-articulating dummies that are mounted to a moving platform via central pole. The platform motion is provided by cables and an off-board motor. The leg motion is driven from hip-mounted motors, and the motion profiles are programmable, but not constrained to platform motion such that lower leg motion is largely uncontrolled (passive) with no positive control of leg posture as a function of longitudinal position. Consequently, the foot can move relative to ground during the "stance" phase of the dummy's gait. It is this deficiency that can affect the testing of current PAEB systems, which may not necessarily recognize the dummy as a pedestrian, if the foot is not in contact with the ground during the "stance" phase of the gait.

The innovations disclosed in this application address these shortcomings and provide a pedestrian dummy with a stance foot that remains in the same position relative to the floor when the platform that carries the dummy is in motion. This more naturally simulates the actual gait of a pedestrian, yielding better results for testing PAEB systems.

4.0 SUMMARY

The present invention provides an elegant solution to the needs described above and offers numerous additional benefits and advantages, as will be apparent to persons of skill in the art. In one aspect, a Dynamic Motion Element (DME) is disclosed that includes a platform, and a pair of foot movement mechanisms. The foot movement mechanisms each include a drive pulley connected to at least one wheel of the DME, a second pulley and a foot drive belt that has a foot connection structure constructed to detachably connect to the foot of the mannequin. The foot connection structure is constructed to move about each pulley. The first and second foot movement mechanisms are constructed such that when the DME moves in a longitudinal direction relative to the ground, the foot connection structure of the first foot movement mechanism remains in substantially the same longitudinal position relative to the ground while the foot connection structure of the second foot movement mechanism moves in the same longitudinal direction as the DME. When a mannequin is connected to the foot connection structures, the DME produces a more natural looking gait.

The foot connection structures comprise a magnet, a hook and loop fastener or a pin, such that the mannequin can detach from the connection structure if the mannequin is struck by the test vehicle. The DME may include a front ramp connected to the platform, the front ramp constructed to allow a test vehicle to ride over the ramp onto the platform. The DME may have one wheel that is the steering wheel capable of changing the direction of the DME and another wheel that is connected to a motor such that the DME can be propelled. The DME may also have electronically controlled brakes. The steering, motor and brakes may be connected to a central processor and wireless receiver such that a base station can control the movement of the DME. The base station may also send wireless instruction/commands to the test vehicle and control the movement of that vehicle as well. To maintain accurate positioning, the DME and/or the test vehicle may have a global positioning system.

To elevate the leg of the mannequin more vertically when the leg is in the swing phase of the gait, each foot movement mechanism may include a third (or more) pulley that is elevated above the drive and second pulley.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

5.0 BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

FIG. 2A illustrates a rear facing isometric view of the DME with a mannequin (dummy) mounted, while

6.0 DETAILED DESCRIPTION

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

The following list of example features corresponds with FIGS. 1-23 and is provided for ease of reference, where like reference numerals designate corresponding features throughout the specification and figures:

Dynamic Motion Element (DME) 10
Global Positioning System Antenna 15
Platform 20
First foot movement mechanism 22
Drive pulley 25
Idler/tensioner pulley 30
Foot Drive belt 35
Foot connection structure 40
Second (Opposite) foot movement mechanism 45
Rotational direction of foot belt drive 50
Directional movement of DME 55
Mannequin (Dummy) 60
Mannequin (Dummy) support structure 62
Stance foot 65
Swing Foot 70
Stance phase (for shaded foot) 75
Swing Phase (for shaded foot) 80
Portion of foot drive belt that moves relative to the DME with a direction and magnitude opposite to the movement of the DME relative to the ground 82
Stance foot position on ground 85
DME front ramp 90
DME side ramp 95
DME back ramp 100
Front wheel (steering) 105
Rear wheel (driven) 110
Test vehicle 115
Impact on mannequin 120
Release from foot connection structure 125
Mannequin (Dummy) ejection motion 130
Additional idler pulleys 135*a*, 135*b*
Cam 136
Cam peak 137
Cam follower 138
Foot hinge connector 139
GST System architecture 140
Subject (test) vehicle 145
Base station 150

The present invention is a new means of providing articulated/striding leg motion for a strikeable pedestrian dummy/mannequin for use in PAEB system evaluations and testing. The present invention provides the pedestrian dummy/mannequin leg motion via motive force applied to the feet of the mannequin from a moving platform, which carries the pedestrian dummy (e.g., a Dynamic Motion Element.) The motion applied to the foot of the mannequin can be tightly constrained to the overall motion of the mannequin across the ground because it is driven from the platform which provides the overall forward motion. This tight constraint can therefore closely replicate the foot-stationary "stance" phase of the gait.

Figure 6:
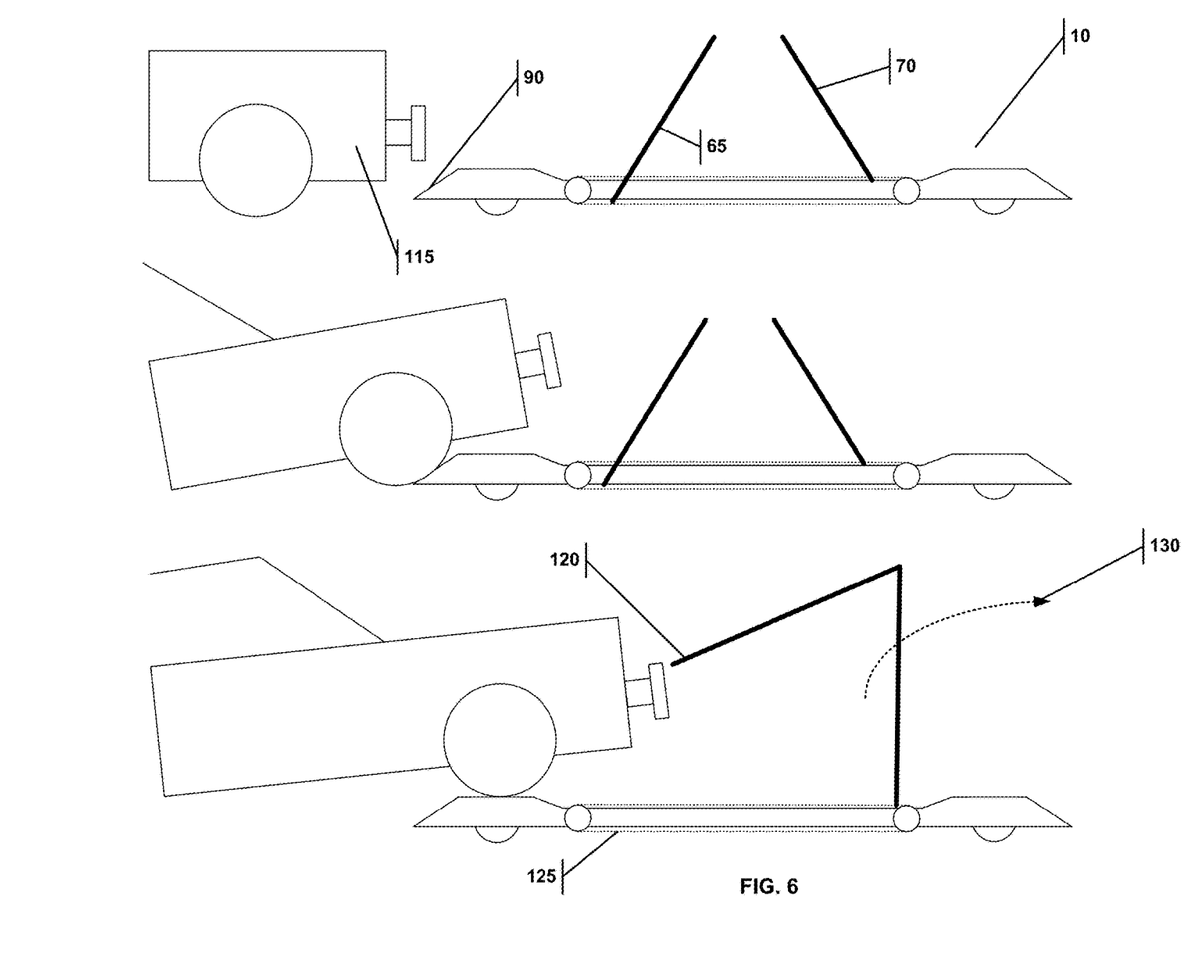
FIG. 6. Illustrates how a test vehicle can drive up onto the DME knocking the mannequin (dummy) from its mount.

The foot of the dummy/mannequin is attached to the mechanism via magnets or other detachable means, such as a hook and loop fastener (e.g., Velcro), a pin, so that the dummy/mannequin can separate from the moving platform in the event of a collision (see FIG. 6). Movement of the foot attachment point can be provided by gears and/or belts and is constrained to the motion of the drive wheels.

The invention comprises the following physical components:
a. Moving platform or DME 10 (either self-propelled, or propelled by some off-board means) to which the pedestrian dummy main body 60 is attached (via pole 62, stand or other means).
b. Foot movement mechanism 22 comprised of:
  i. A foot drive pulley or gear 25. This drive pulley 25 is constrained to the motion of the DME 10 via gears and/or belts/chains attached to a drive wheel, belt or track 110 in contact with the ground.
  ii. A foot drive belt 35. This belt 35 is driven by the foot drive pulley or gear 25, and follows a path, in a vertical plane, defined by the position of one or more idler pulleys or gears 30.
  iii. A foot connection structure 40 (such as a magnet, pin, hook and loop fastener (Velcro), or other detachable means). This connects the foot drive belt 35 the foot of the dummy 60.

Figure 1:
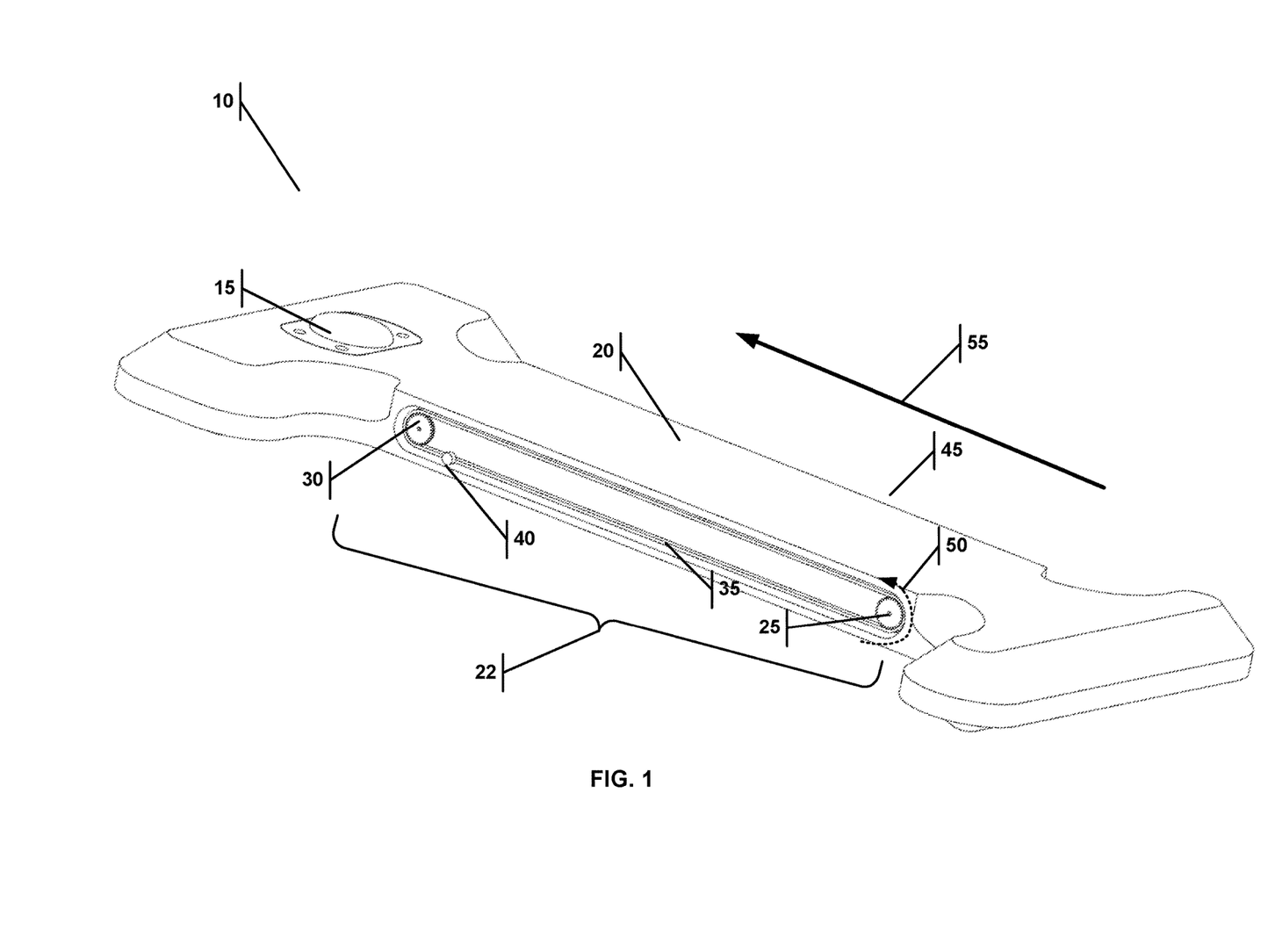
FIG. 1 illustrates an isometric view of the DME that supports a mannequin (dummy).

FIG. 1 provides a close-up view of the moving platform or DME 10 of the invention. The main components are the platform 20, which supports the weight of the dummy, and the foot movement mechanisms 22 and 45 disposed on either side of the platform 20. The first foot movement mechanism 22 is comprised of: at least one drive pulley 25, at least one idler/tensioner pulley 30, the foot drive belt 35, and a foot connection structure 40, which can move about each pulley. On the underside of the DME 10 are wheels that drive it forward. As the DME 10 is driven forward, gears and belts connecting the drive wheels to the foot drive pulley 25 gear cause the foot drive belt 35 to move around a path described by one or more idler pulleys 30. The direction of forward motion of the DME 10 is indicated by 55, and the direction of motion of the foot drive belt 35 is indicated by 50 in FIG. 1. When the DME 10 moves in a longitudinal direction 55 relative to the ground, the foot connection structure 40 of the stance foot remains in substantially the same longitudinal position relative to the ground, while the foot connection structure 40 of the swing foot moves in the same longitudinal direction 55 as the DME 10.

This connection may be accomplished in any number of ways. For example, mechanically connecting the drive wheel to the drive pulley 25 via a shaft or belt in a 1:1 ratio, with both the drive wheel and the drive pulley having the same diameter. Or, the drive pulley 25 may have an independent motor that has a predetermined relationship with the DME 10 motor—e.g., the relationship of the DME motor and foot pulley motor is 1:1 and the drive wheel and drive pulley 25 are the same diameter. A different rotational ratio may be used, provided the size of the drive wheel and drive pulley 25 have an inverse circumference ratio. Alternatively, the foot drive belt 35 may contact the ground and be connected to a drive pulley 25 of the same diameter as the drive wheel or any other wheel on the DME 10, such that when the DME 10 moves, the drive pulley 25 rotates. In all of these examples, the connection between the DME and the foot drive belt 35 is such that a portion of the foot belt drive 82 moves relative to the DME with a direction and magnitude opposite to the movement of the DME relative to the ground, this is shown in greater detail in FIG. 4. Therefore it is preferred that the mechanical connection between the drive wheels of the DME 10 and the foot drive pulley 25 are such that a portion of the foot drive belt 35 remains in the same longitudinal position, relative to the ground, as the DME 10 moves.

Figure 2A:
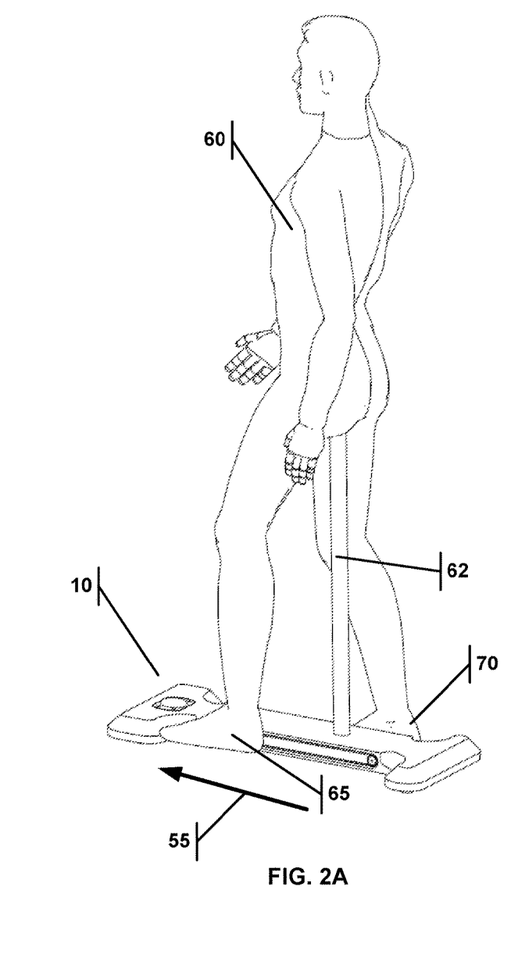
Figure 2B:
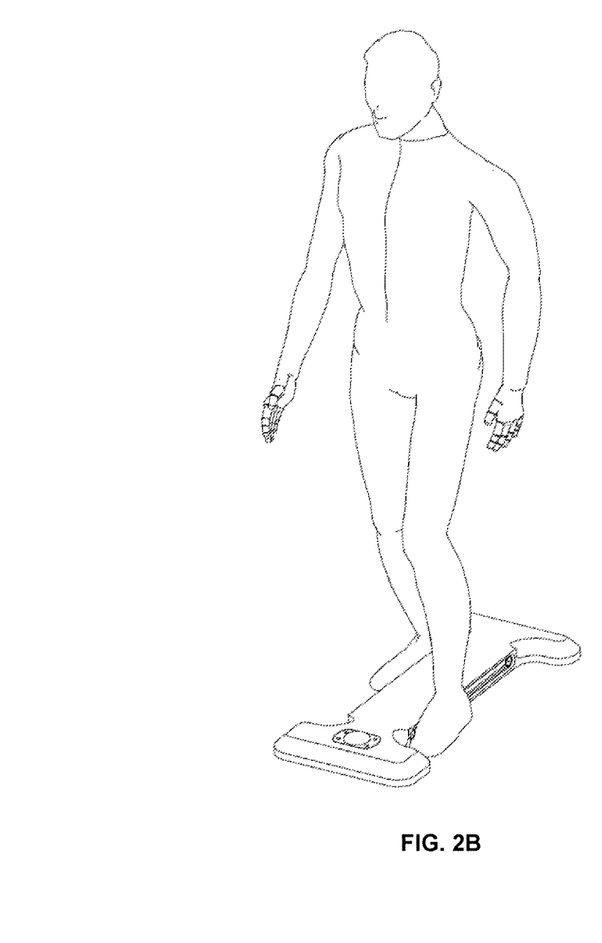
FIG. 2B is a forward facing isometric view of the same mannequin (dummy) mounted on the DME.

In FIG. 2, the DME 10 is seen in relation to the mannequin (dummy) 60 mounted to the platform 20 via a mannequin (dummy) support structure 62. The mannequin has a torso, two legs, and two feet, and the torso is attached to the mannequin support structure 62. The mannequin support structure 62 may be a pole, stand or other means of support. Note that the legs of the mannequin have degrees of freedom about the hip and knee joints, so that while the mannequin support structure 62 stabilizes the torso of the mannequin 60, forward striding motion can be achieved, as the foot movement mechanisms 22 and 45 respectively drive the stance foot 65 and swing foot 70. It is well-known in the art to apply light springs or bungees (not drawn) across the front of the hip joints, and behind the knee joints, such that the dummy would normally take on a slight "squatting" posture if the feet 65 and 70 were not connected to the DME 10. In the present invention, each foot of the mannequin (dummy) 60 is attached to its respective foot drive belt 35 via a detachable foot connection structure 40, so that the mannequin (dummy) 60 can detach from the moving platform 10 in the event of a collision. The detachable foot connection structure 40 may attach the foot to the foot drive belt 35 via magnets, pins, Velcro or other hook and loop fastener methods. Other means of detachably securing the foot to the foot drive belt 35 may be used without departing from the scope and spirit of the present invention.

The motion of the foot drive belt 35 is similar to that of a tank track, for which the track is in non-slip contact with the ground while the tank moves forward. Here, the foot drive belt 35 may not be in direct contact with the ground, nevertheless the lower portion of the belt 35 is constrained such that there is no motion relative to the ground while the DME 10 advances. This is achieved through appropriate gear ratios between the drive wheel (in contact with the ground) and the foot drive pulley gear (connected to the dummy foot 65). The foot 65, which is attached to the foot drive belt via magnets or other means in the foot connection structure 40, moves through the various phases of the gait, with the "stance" phase properly replicated by the lack of relative motion between the foot and the ground as the DME 10 advances.

Figure 3:
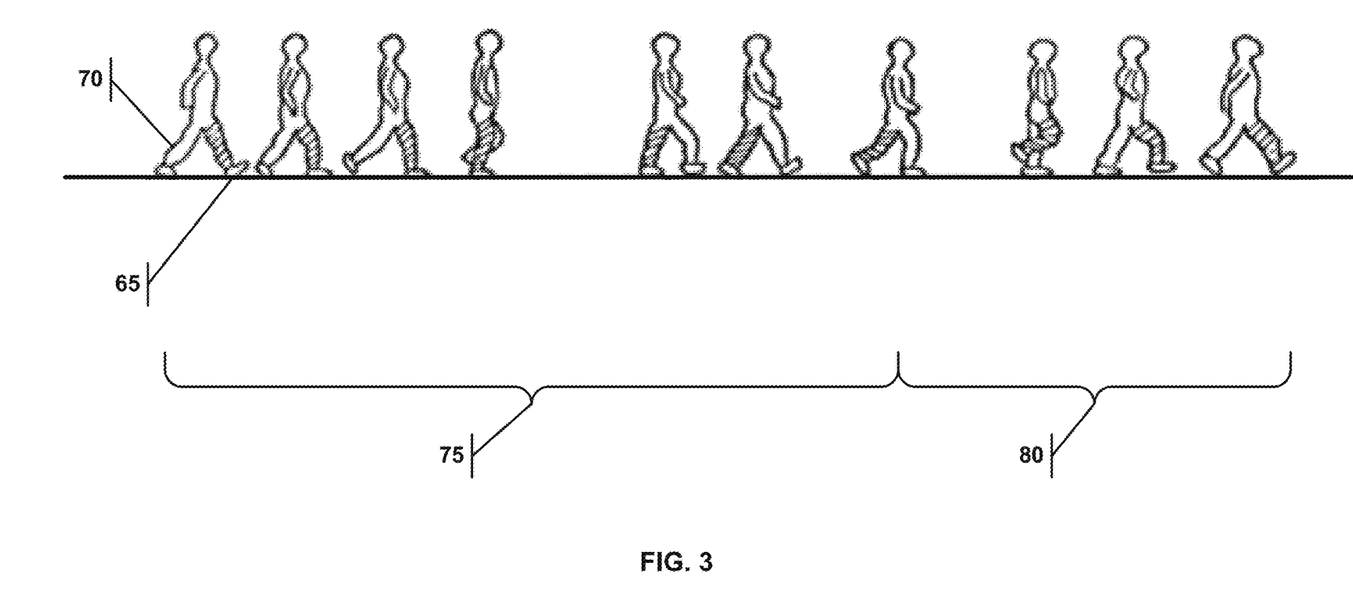
FIG. 3 illustrates the stance and swing phases of a gait.

FIG. 3 illustrates the stance phase 75, where the stance foot 65 (cross hatched) does not move longitudinally relative to the ground, and the swing phase 80, where the foot moves longitudinally relative to the ground. As discussed above, the prior art systems could not mirror this stance phase/swing phase of a pedestrian's feet, making it difficult, to accurately evaluate and test PAEB systems.

Figure 4:
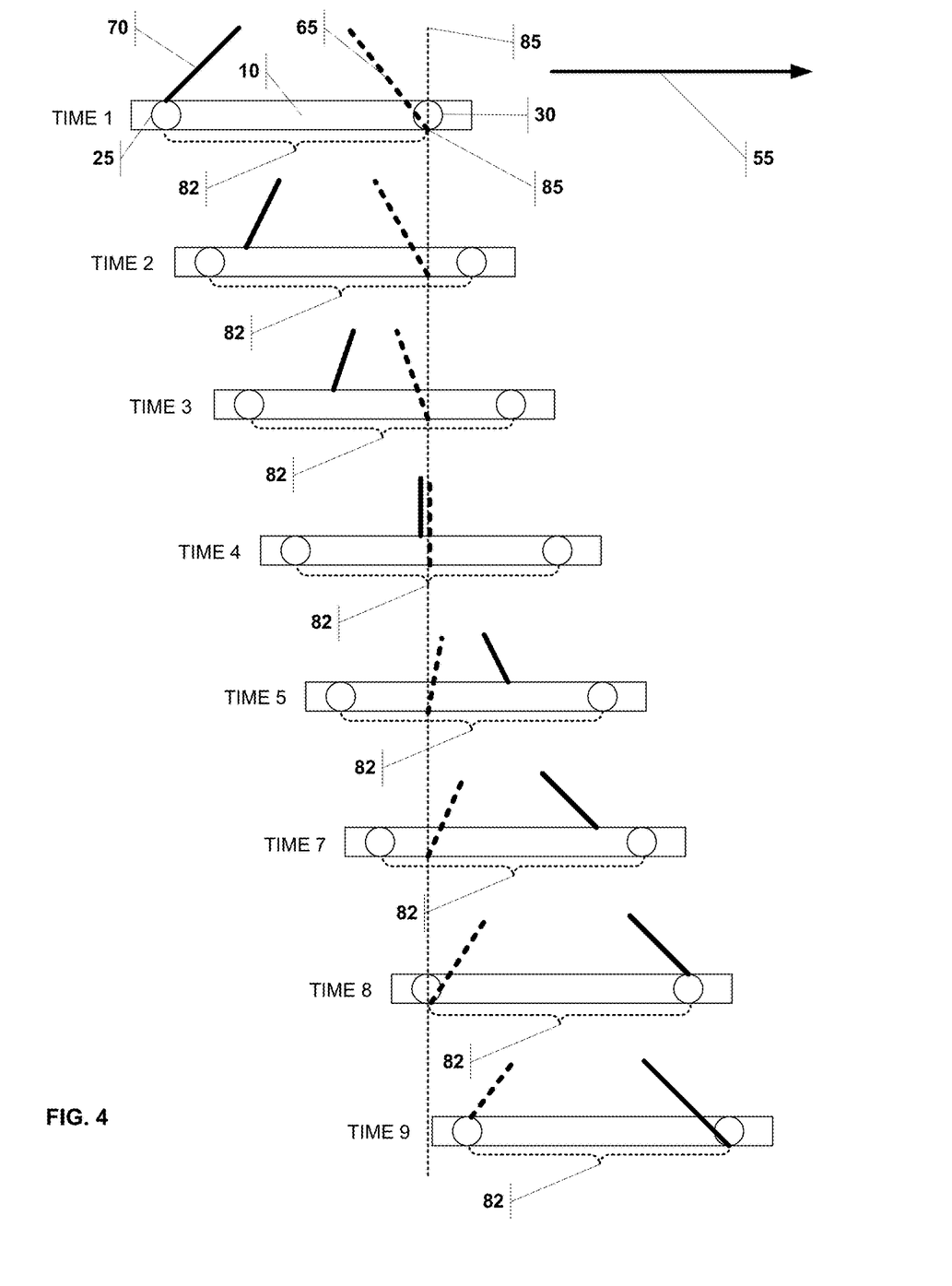
FIG. 4 illustrates the movement of the DME, the stance foot and swing foot relative to the ground.

FIG. 4 illustrates the operation of the DME 10, with the pulleys 25 and 30 connected to each other by the foot drive belt 35. The stance foot 65 is connected to the foot drive belt 35 at position 85 (note that position 85 is shown for all time periods illustrated in FIG. 4 as a dashed line 85). As the DME moves in direction 55, the stance foot 65 remains in the same longitudinal position for time periods 1 through 8, representing the stance phase for this foot. The stance foot 65 is in the portion of foot drive belt 82 that moves relative to the DME with a direction and magnitude opposite to the movement of the DME (relative to the DME). During these time periods, the swing foot is moving longitudinally relative to the ground in the same direction as the movement of the DME 10 (i.e., same direction as arrow 55). Time period 9 illustrates that the previously denoted stance foot 65 (shown as a dashed line) is now the swing foot and the previously denoted swing foot is now the stance foot.

Figure 5:
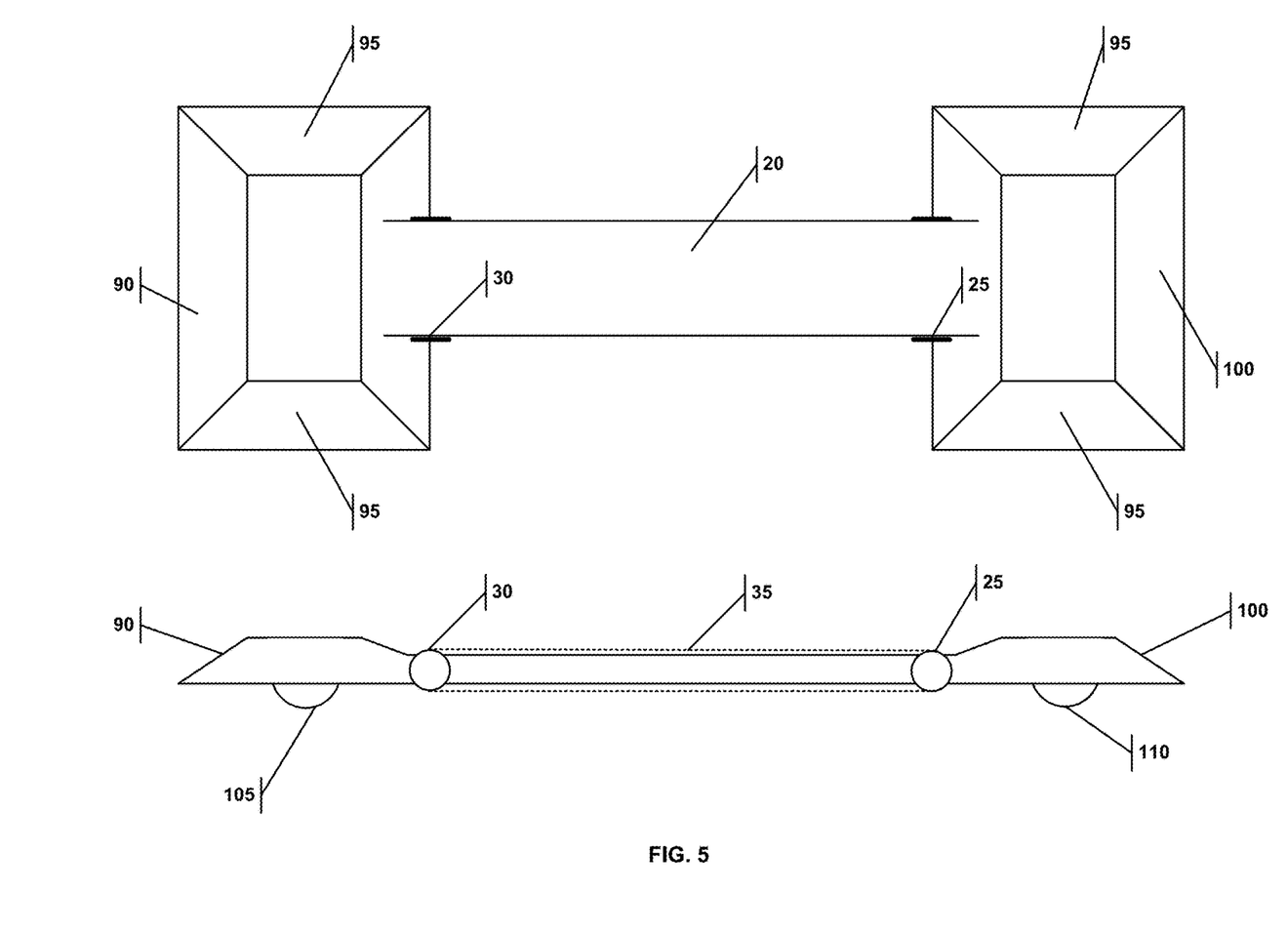
FIG. 5 illustrates the top and side views of the DME.

FIG. 5 shows a rear wheel driven embodiment of the DME 10 when viewed from the top and from the side. In these views, the DME front ramp 90 is located at the front end of the DME 10, and the DME back ramp 100 is located at the rear end of the DME 10, with corresponding side ramps both in the front and in the back. All ramps are connected to the center platform 20 of the DME 10. The purpose of these ramps is to facilitate a test vehicle to drive over the ramp and impact not the DME 10 itself, but the mannequin 60 detachably situated on top of the DME 10. In the side view, the rear wheel 110 is the driving wheel, which may be powered by a motor connected through gear(s) and/or belt(s), and the front wheel 105 is the steering wheel, which can be used to change the direction of the DME 10.

It is apparent to one skilled in the art that while the DME 10 requires only two wheels, more wheels may be used without departing from the spirit and scope of this invention. Also, although only a rear wheel driven embodiment is shown, it is obvious to one skilled in the art to modify the embodiment to a front wheel (or all-wheel) driven DME embodiment.

Since FIG. 5 portrays the rear wheel driven embodiment, with one or more motors connected to the rear wheel 110, it is natural to have the drive pulley 25 be located close to the one or more motors so as to be driven from the same power source. Alternatively, the drive pulley 25 may have its own motored power source separate from that of the driving wheel 110. The one or more idler/tensioner pulleys 30 is located towards the opposite end of the DME 10 from the drive pulley 25, and the foot drive belt 35 connects the drive pulley 25 and the idler tensioner pulleys 30, as described previously.

The foot movement mechanism shown in the present embodiment is mechanical in nature, featuring gears and/or belts to properly coordination the motion of the dummy's feet. However, the foot movement mechanism can also be electrically controlled, wherein electromechanical servo motors can be used to move the feet, as a function of the forward motion of the DME 10. Alternative foot drive mechanisms or variations may exist, but do not depart from the scope and spirit of this invention so long as the primary plane of motion is in the horizontal plane, and the foot is not raised substantially above the ground during the stance phase.

One alternative embodiment, for example, may use small platforms on which the dummy's feet rest. These small platforms could provide the foot motion relative to the main platform, and can also provide pitching motion of the foot during the swing phase to better mimic a human foot throughout the gait. The pitching motion of these platforms could be accomplished with a cam and cam follower.

In another anticipated embodiment, the foot motion can be driven by a passive wheel or belt in contact with the ground, so that the overall motion of the DME 10 can be provided by off-board means, such as cables, belts, rods, etc., and not by an onboard motor driving the DME 10.

The forward motion of the DME 10 can be measured by counting the revolutions of a wheel, belt or track in contact with the ground, or via a global positioning system or other non-contact means such as Locata, laser scanner, RADAR, etc. The DME 10 may be controlled wirelessly through a remote connection.

FIG. 6 depicts sequentially some of the steps of a frontal collision event. In the top diagram, a test vehicle 115 is driving in the path of the DME 10. The pedestrian dummy 60 (represented by the stance foot 65 and the swing foot 70) is carried forward on the DME 10 toward the test vehicle 115. Then, the test vehicle 115 drives or rides over the DME front ramp 90, and impacts (120) with the mannequin (dummy) 60. At the moment of the collision, the foot of the mannequin (dummy) 60 is released from the foot connection structure (125). The dummy 60 then travels along an ejection motion path (130). In the system of the present invention, the foot connection structure 40 is detachable from the dummy foot 65 and 70 to minimize damage to the dummy 60 when testing PAEB The DME 10 can then be undamaged by collisions and may be used repeatedly for tests.

Figure 7:
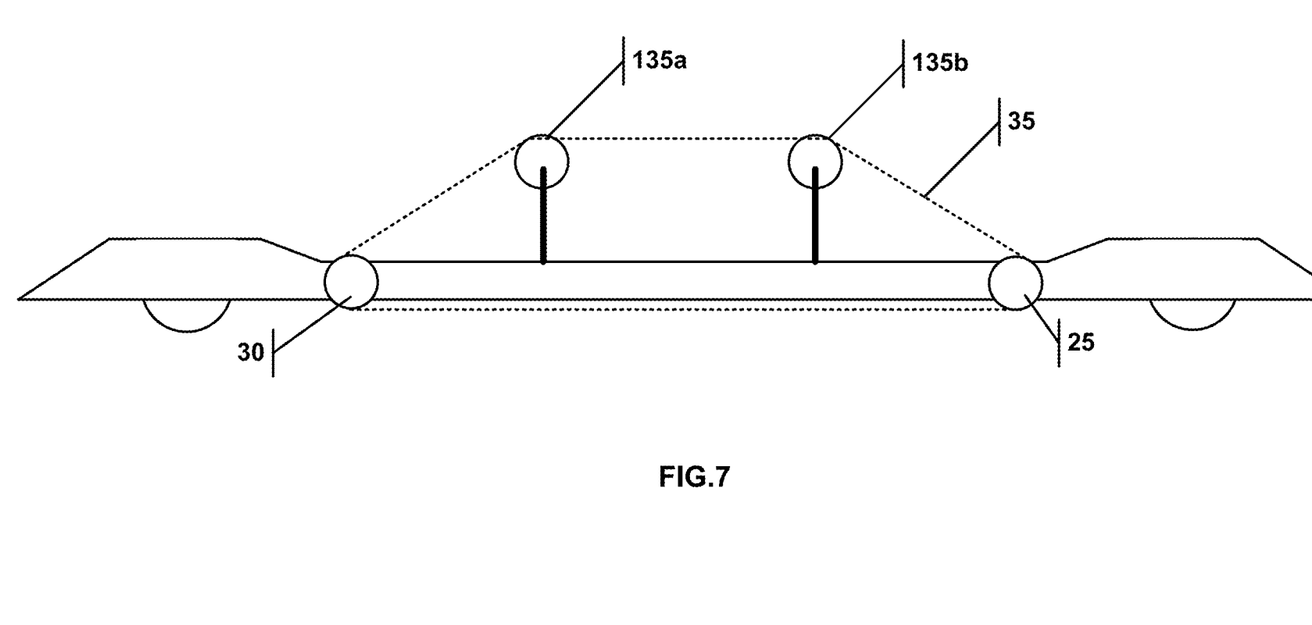
FIG. 7 illustrates an alternate embodiment of the DME that allows for more vertical motion of the mannequin's feet while the DME is in motion.

FIG. 7 shows that the vertical profile of the foot movement can be tailored by the addition of idler pulley(s) 30, here illustrated as 135*a* and 135*b*, to alter the route of the foot drive belt 35 and the attached foot to more naturally mimic the foot motion of a human pedestrian, particularly during the swing phase of the foot. The additional idler pulleys 135*a* and 135*b* are elevated above the drive pulley 25 and the original idler/tensioner pulley 30 to lift the foot. Instead of a flat gliding foot movement along a flat foot drive belt 35 path, with the addition of idler pulleys 135*a* and 135*b* the attached foot may be lifted, and can move up or down as a function of the gait phase.

Figure 8:
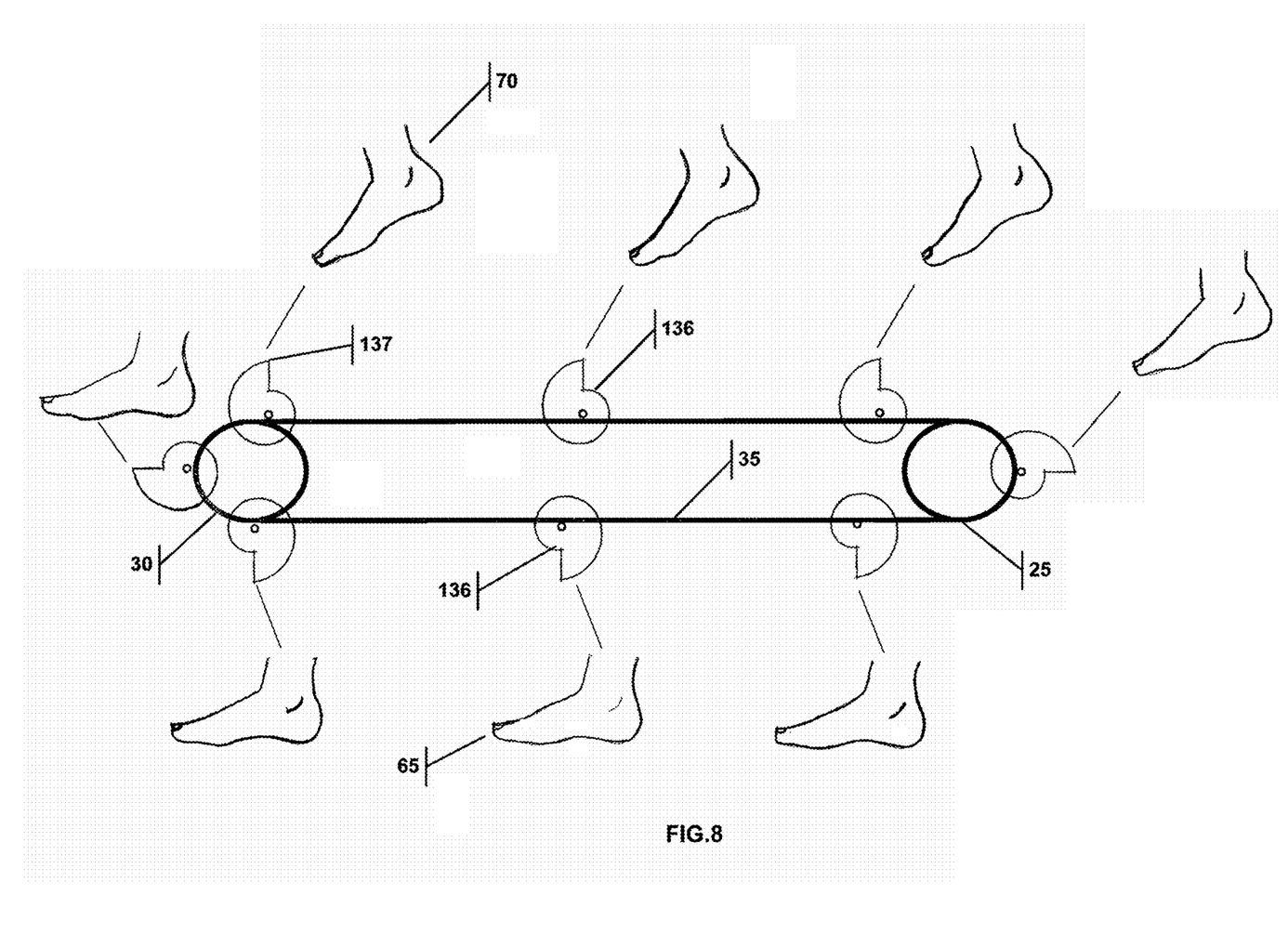
FIG. 8 illustrates a cam and cam follower used in the foot connection structure to lift the lift the heel of the foot for a more natural looking gait.
Figure 9A:
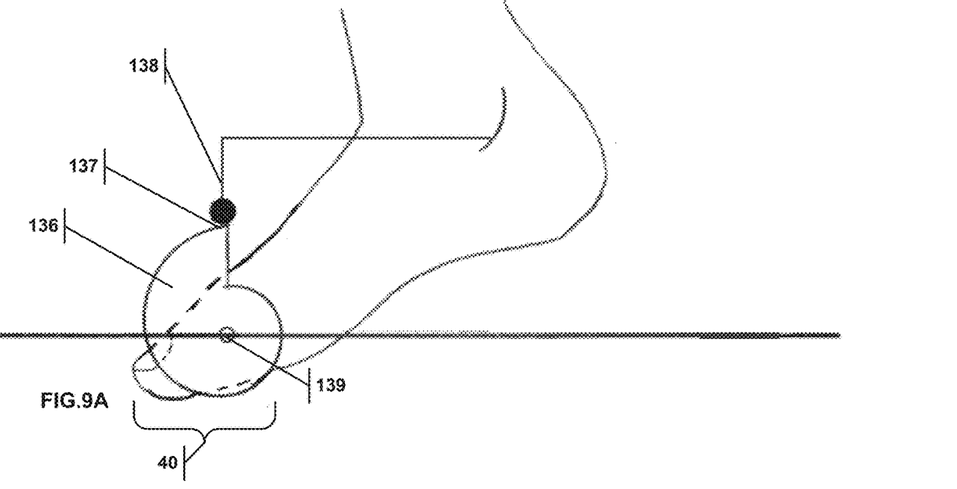
FIG. 9A illustrates the positions of the cam and cam follower when the heel is lifted.
Figure 9B:
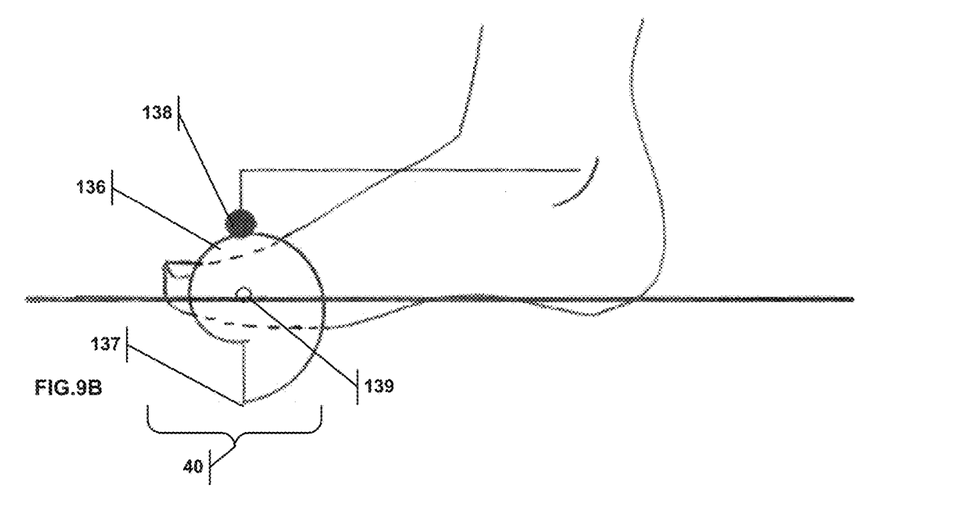
FIG. 9B illustrates the positions of the cam and cam follower when the heel is lowered.

FIGS. 8-9B illustrates a cam 136 and cam follower 138 used in the foot connection structure 40 to lift the lift the heel of the swing foot 70 for a more natural looking gait. The cam 136 is connected to the foot drive belt 35 and makes a full rotation each time the foot drive belt 35 makes a full rotation as shown in FIG. 8. The cam 136 is shown as a snail shape with a cam peak 137. As the cam 136 turns, the cam follower 138, also connected to the foot rides along the surface of the cam 136 causing the heel to lift and return to the horizontal position as shown in FIGS. 9A and 9B. The foot may also be pivotably connected to the foot drive belt 35 by a foot hinge connector 139. In the illustration shown in FIG. 8-9A, the foot connection structure 40 includes the cam and the foot hinge connector 139; further the foot hinge connector 139 may be constructed so as to allow the foot to be dislodged from the foot belt drive should the mannequin be impacted as detailed above.

Figure 10:
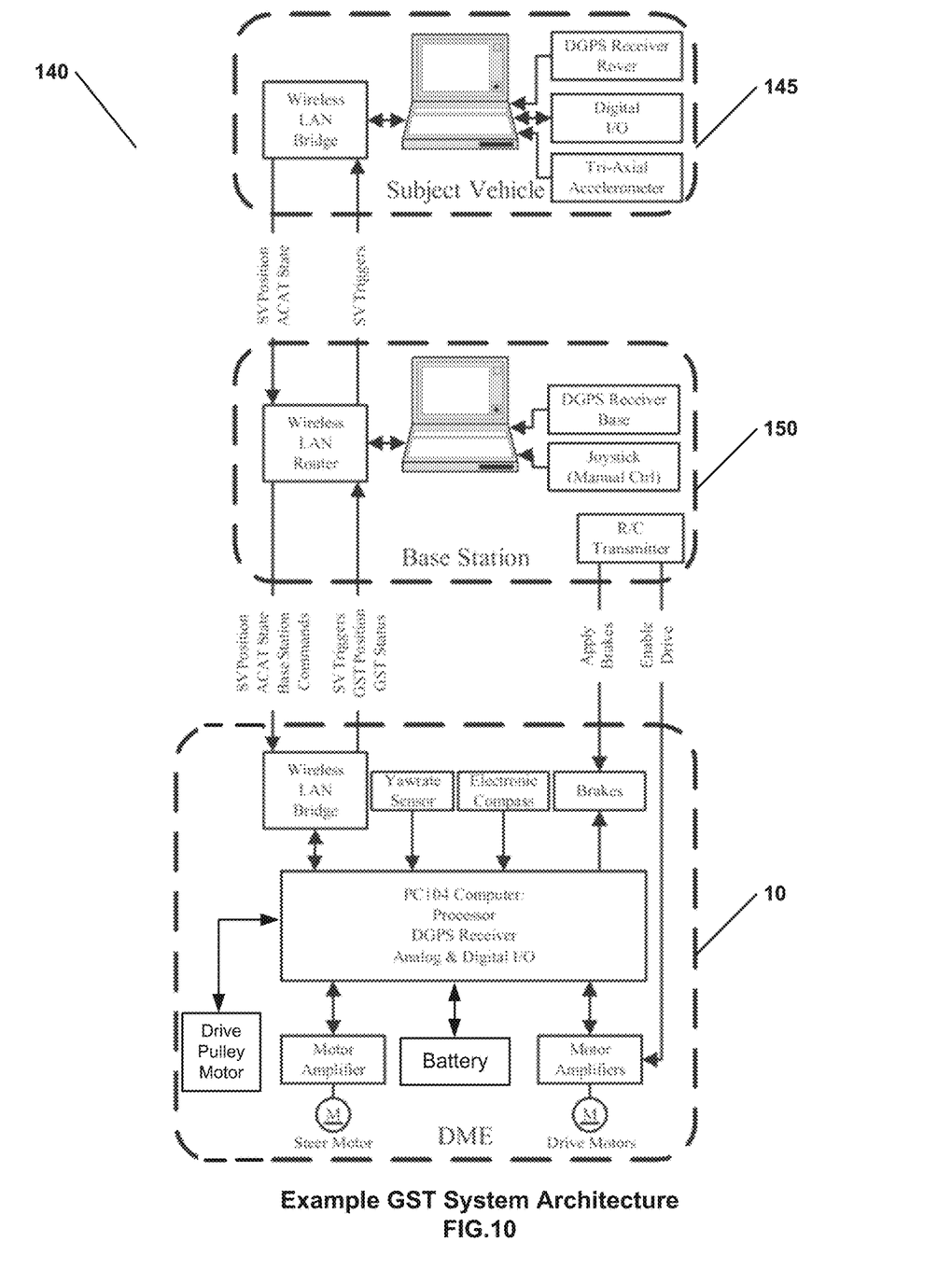
FIG. 10 illustrates an example GST System architecture.

FIG. 10 illustrates a Guided Soft Target (GST) architecture 140, comprised of the DME, the subject (test) vehicle 145 and the base station 150. The base station 150 uses wireless means to communicate with and send commands to both the subject vehicle 145 and the DME 10. In FIG. 8, the base station 150 is illustrated as having a wireless LAN router transmitting commands to the subject vehicle 145 and to the DME 10, but other means of wireless communication, including radio modem, are equivalent and well-known to those skilled in the art. The DME 10 and subject vehicle 145 each has a computer or controller to perform various I/O functions to control its peripherals and provide measured data to the onboard system and/or the base station 150.

The base station 150 may include a differential GPS (DGPS) base station receiver, computer, joystick, and radio transmitter, as illustrated as a non-limiting example in FIG. 10. The computer associated with the base station 150 may allow an operator of the system to run a complete suite of tests from a single location. From this computer, the operator may perform one or more of the following functions: setup and configuration of the subject vehicle 145 via a remote connection; monitoring of subject vehicle 145 and GST positions, speeds, system health information and other system information; setup of test configuration; test coordination; post-test data analysis; and selection of GST modes, including, for example, hold mode, manual mode, semi-autonomous mode, and fully autonomous mode. Alternatively, the operator's console may be located in the subject vehicle 145, in which case the base station 150 would simply broadcast and receive wireless signals and record test data. The DGPS receiver in the base station 150 may provide corrections to the roving DGPS receivers in the DME 10 and the subject vehicle 145. This may be accomplished via WLAN or other communications network, without a separate DGPS radio modem, minimizing the number of antennas in the GST system 140. This may be important for the DME 10, since all connections to antennas are typically made frangible, such that they can separate from the DME 10 in the event of a collision with the subject vehicle 145.

The computer associated with the subject vehicle 145 may measure data, perform various data I/O functions within the subject vehicle 145, and communicate the data to the rest of the GST system 140. The subject vehicle 145 may include one or more of the following: DGPS receiver, wireless receiver, tri-axial accelerometer, digital I/O board to monitor and control discrete events (e.g., sense ADAS warning on/off, illuminate LEDs, initiate open-loop braking, provide audible alerts), wireless LAN bridge or wireless/radio communication interface. Although the base station 150 acts as the central hub for all communications, the subject vehicle 145 may provide an operator console for the operator to control the subject vehicle 145. The subject (test) vehicle 145 can use its wireless receiver to receive wireless instructions from the base station 150 to control the movement of the subject (test) vehicle 145.

On the DME 10, there may be included a wireless receiver, a yawrate sensor, an electronic compass, brakes, a battery system, and one or more motor actuators as well as a computer/controller/processor for central processing. The motor actuators may comprise one or more drive motors and may additionally feature a steering motor and/or amplifiers for the motor actuators. The drive motor(s) propels the DME 10 to move longitudinally on the ground. The drive motor is connected to a processor, which controls the motor's operation and the motion of the DME 10. The processor can also send signals to control a brake adapted to stop the DME 10. The brake onboard the DME 10 may be electronically controlled directly by the processor or alternatively may be activated mechanically through an intermediary actuator receiving electronic signals. The wireless receiver onboard the DME 10 receives wireless instructions from the base station 150 that contains information on how to operate or activate the one or more motors and electronically controlled brake. Although omitted from FIG. 8 to simplify the view of the GST system architecture 140, the DME 10 may also comprise a global positioning system to guide its path of motion.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus it is to be understood that the description and drawings presented herein represent a presently-preferred embodiment of the invention and are therefore representative of the subject matter which is broadly contemplated by the present invention. It is further understood that the scope of the present invention fully encompasses other embodiments that may become obvious to those skilled in the art, and that the scope of the present invention is accordingly limited by nothing other than the appended claims.

The invention claimed is:

1. A dynamic motion element (DME) comprising:
a platform supported by at least two wheels;
a first and second foot movement mechanism, each comprising:
   a drive pulley constructed to rotate when the DME moves in a longitudinal direction relative to the ground;
   a second pulley;
   a foot drive belt attached to the drive pulley and the second pulley, the foot drive belt comprising a foot connection structure constructed to detachably connect to the foot of a mannequin, the foot connection structure constructed to move about each pulley;
wherein when the first and second foot movement mechanisms are constructed such that when the DME moves in a longitudinal direction relative to the ground, the foot connection structure of the first foot movement mechanism remains in substantially the same longitudinal position relative to the ground while the foot connection structure of the second foot movement mechanism moves in the same longitudinal direction as the DME.

2. The DME of claim 1 wherein the foot connection structure comprises a magnet, a hook and loop fastener or a pin.

3. The DME of claim 1 further comprising a ramp connected to the platform, the ramp constructed to allow a test vehicle to ride over the ramp onto the platform.

4. The DME of claim 1 wherein one of the wheels is a steering wheel constructed to change the travel direction of the DME.

5. The DME of claim 1 wherein one of the wheels is a driven wheel constructed to propel the DME.

6. The DME of claim 1 comprising a motor connected to at least one of the wheels.

7. The DME of claim 1 wherein each foot movement mechanism comprises a third pulley that is elevated above the drive and second pulley.

8. The DME of claim 1 further comprising an electronically controlled brake connected to at least one of the wheels.

9. The DME of claim 1 further comprising:
a motor constructed to propel the DME, the motor connected to a processor;
an electronically controlled brake constructed to stop the DME, the brake connected to the processor
a wireless receiver connected to the processors, the wireless receiver constructed to receive wireless instructions to activate the motor or brake.

10. The DME of claim 1 further comprising a global positioning system.

11. The DME of claim 1 wherein the foot connection structure comprises a cam and the foot of the mannequin comprises a cam follower in contact with the cam, wherein rotation of the cam causes the heel of the foot of the mannequin to lift and lower.

12. A system for testing crash avoidance technologies on a test vehicle, the system comprising:
a dynamic motion element (DME) comprising:
   a platform supported by at least two wheels, the platform comprising a mannequin support structure;
   a first and second foot movement mechanism, each comprising:
      a drive pulley constructed to rotate when the DME moves in a longitudinal direction relative to the ground;
      a second pulley;
      a foot drive belt attached to the drive pulley and the second pulley, the foot drive belt comprising a foot connection structure constructed to detachably connect to the foot of a mannequin, the foot connection structure constructed to move about each pulley;
   wherein when the first and second foot movement mechanisms are constructed such that when the DME moves in a longitudinal direction relative to the ground, the foot connection structure of the first foot movement mechanism remains in substantially the same longitudinal position relative to the ground while the foot connection structure of the second foot movement mechanism moves in the same longitudinal direction as the DME;
a mannequin with a torso, two legs, and two feet, the torso attached to the mannequin support structure, and one foot connected to the foot connection structure of the first foot movement mechanism and the other foot connected to the foot connection structure of the second foot movement mechanism.

13. The system of claim 12 wherein the foot connection structure comprises a magnet, a hook and loop fastener or a pin.

14. The system of claim 12 further comprising a ramp connected to the platform, the ramp constructed to allow the test vehicle to ride over the ramp onto the platform.

15. The system of claim 12 wherein one of the wheels is a steering wheel constructed to change the travel direction of the DME.

16. The system of claim 12 wherein one of the wheels is a driven wheel constructed to propel the DME.

17. The system of claim 12 comprising a motor connected to at least one of the wheels.

18. The system of claim 12 wherein each foot movement mechanism comprises a third pulley that is elevated above the drive and second pulley.

19. The system of claim 12 further comprising an electronically controlled brake connected to at least one of the wheels.

20. The system of claim 12 wherein the DME further comprises:
a motor constructed to propel the DME, the motor connected to a processor;
an electronically controlled brake constructed to stop the DME, the brake connected to the processor;

a wireless receiver connected to the processors, the wireless receiver constructed to receive wireless instructions to activate the motor or brake.

21. The system of claim 20 further comprising a base station constructed to send the wireless instruction to the wireless receiver of the DME.

22. The system of claim 21 wherein the test vehicle comprises a wireless receiver and the base station is constructed to send wireless instruction to the test vehicle to control the movement of the test vehicle.

23. The system of claim 12 wherein the DME further comprises a global positioning system.

24. The system of claim 12 wherein the foot connection structure comprises a cam and the foot of the mannequin comprises a cam follower in contact with the cam, wherein rotation of the cam causes the heel of the foot of the mannequin to lift and lower.

* * * * *